United States Patent [19]

Hayakawa et al.

[11] 4,252,589
[45] Feb. 24, 1981

[54] METHOD FOR FORMING A MARK INDICATION ON A TIRE SIDE WALL

[75] Inventors: Toshio Hayakawa, Higashimurayama; Shoji Yoshida, Higashikurume; Katsuyuki Harakon, Kodaira, all of Japan

[73] Assignee: Bridgestone Tire Company Limited, Toyko, Japan

[21] Appl. No.: 953,322

[22] Filed: Oct. 20, 1978

[30] Foreign Application Priority Data

Oct. 28, 1977 [JP] Japan ............................ 52/128746

[51] Int. Cl.³ .................... B29H 17/02; B60C 13/00
[52] U.S. Cl. ................... 156/116; 152/353 R; 152/DIG. 12; 264/36; 264/248; 264/326
[58] Field of Search .............. 156/110 R, 116, 123 R; 152/353 R, DIG. 12; 264/248, 36, 326

[56] References Cited

U.S. PATENT DOCUMENTS

| | | | |
|---|---|---|---|
| 3,285,314 | 11/1966 | Roberts | 156/116 |
| 3,382,120 | 5/1968 | Rudder | 156/116 |
| 3,427,215 | 2/1969 | Crocker | 156/116 |
| 3,443,619 | 5/1969 | Kindle | 152/330 |
| 3,648,748 | 3/1972 | Lovell | 152/353 |
| 3,663,328 | 5/1972 | Turoczi | 156/116 |
| 4,019,945 | 4/1977 | Look et al. | 156/116 |

OTHER PUBLICATIONS

"Annual Book of ASTM Standards", Part 37, pp. 521-528, ASTM, Philadelphia, Pa. 1979.

*Primary Examiner*—John E. Kittle
*Attorney, Agent, or Firm*—Sughrue, Rothwell, Mion, Zinn, & Macpeak

[57] ABSTRACT

A mark indication is formed on the tire side wall by sticking partially vulcanized thin rubber sheets provided with mark indications on one side of said sheets along the circumferential direction of the green case at the outer surface corresponding to the side wall of the green case formed on a former and tightly adhering the rubber sheet integrally to the side wall through molding the green case into a toroidal form and vulcanizing said green case.

4 Claims, 4 Drawing Figures

METHOD FOR FORMING A MARK INDICATION ON A TIRE SIDE WALL

BACKGROUND OF THE INVENTION

The present invention relates a method for forming a mark indication on a tire side wall.

DESCRIPTION OF THE PRIOR ART

It has been known that when mark indications, such as letters, symbols or drawings different from the base color (mainly black) of tire are made on tire side walls, in general prior to molding and vulcanization of tire, a green case embedding a colored rubber layer just below the rubber surface layer at the zone of side wall of green case where the mark indication is made, is produced, the green case is molded and vulcanized by means of a mold provided with the mark indication and then the black rubber layer at the portions projecting on the tire surface is buffed to expose the embedded colored rubber. Such marked tire is referred to as "white letter tire". However, the steps for producing such tires are fairly complicated, so that the production cost is high and since a plurality of rubber layers are laminated, the weight of tire is large and there is also a problem in this point.

As one process for solving these problems it has been recently proposed concerning lettering tires that a thin rubber sheet (referred to as "color patch" hereinafter) obtained by printing the mark indications, such as letters, symbols or drawings with the desired color, is stuck on the tire side wall surface and as the sticking process, the following means are usually adopted.

(1) After vulcanizing the tire, a vulcanized color patch is heated and stuck under pressure on such a tire side wall.

(2) After vulcanizing the tire, an unvulcanized rubber patch is stuck on such a tire side wall and then vulcanization is again effected to stick the rubber patch on the tire side wall, and (3) Prior to vulcanizing the tire, a previously vulcanized rubber patch has been stuck on the portion of a mold corresponding to the side wall and the tire is vulcanized by this mold.

In the case of the above described process (1), when the vulcanized color patch is heated and stuck on the vulcanized tire side wall, the physical properties of the cord and rubber at the heated portion are apt to be varied and this process is not preferable. Furthermore, even if the color patch is stuck on the vulcanized tire, the position to be stuck with the color patch is large in the distortion deformation, so that the color patch is apt to be separated.

The above described process (2) intends to solve the defects of the process (1), that is to prevent the variation of the physical properties of the cord and rubber due to the local heating but two times of vulcanizations must be carried out and there is problem in the production cost.

The above described process (3) comprises having stuck the vulcanized color patch to the mold corresponding to the side wall and sticking said color patch to the tire side wall portion when vulcanizing the green case, but when the green case is generally vulcanized, a releasing agent is coated on the outer surface of the green case in many cases in order to decrease formation of inferior products during vulcanization as far as possible, so that the color patch is hindered by the releasing agent during vulcanization and there is problem in the adhesion to the tire. In addition, the color patch stuck to the mold corresponding to the side wall portion is liable to slip off upon contact with the green case and furthermore it is not practically easy to stick the color patch on the mold and even if this process is adopted, the color patch is stuck only on one side of the tire.

Other than the above described problems in the above mentioned conventional processes, the color patch must be stuck at the given position of the tire side wall, that is along the circumference concentric to the rotary axis of the tire, so that a plurality of color patches must be prepared depending upon the size of the tire (diameter size) and therefore the kind of the color patch increases.

An object of the present invention is to obviate a variety of drawbacks in the conventional technics as mentioned above and to provide an advantageous method for forming the mark indications in view of all the productivity, cost and performance.

DESCRIPTION OF THE INVENTION

In general, the tire is produced as follows. Elements (cord, tread, bead and the like) necessary for formation of a tire are integrally set on a cylindrical former to form a green case and the green case is deformed from the cylindrical form to the toroidal form by utilizing the expansion owing to the inflation of the inner pressure of the bladder prior to the vulcanizaton steps of the green case and successively vulcanized in the mold.

In the present invention, rectangular band-shaped color patches are stuck along the circumferential direction of the green case on the cylindrical former at the position to be stuck for advantageously utilizing the course of deforming the cylindrical green case into the toroidal form and then the molding and vulcanizing steps are carried out in the conventional manner. In this case, the color patch is deformed from the rectangular band-shape into an arc-shape following to deformation of the green case into the toroidal shape and formed in the concentric relation to every portion (rim line, decoration line) of the tire where the rotary axis of the tire is center, and accordingly one kind of shape of color patch can be fit to any kind of tires and any size of side walls and there is no problem concerning the adhesion, which has become the above described problems, because the color patch can be handled as a part of the tire.

However, when the conventional unvulcanized or vulcanized color patch is used and applied to the present invention, the following problems are caused and such uses are practically difficult.

(1) In the case of use of the unvulcanized color patch.

The color patch is enlarged upon shaping and the printed mark becomes thin or causes unevenness, or the print itself sticks to the mold to cause stains and the appearance of the formed color patch becomes bad and there is problem in the maintenance in view of vulcanization.

(2) In the case of use of the vulcanized color patch.

When shaping, the color patch does not conform to the deformation of the tire and the color patch slips off or separates and the good product can not be obtained.

According to the present invention, the above described drawbacks are advantageously obviated by using the following color patch as shown in the following example.

A colored raw rubber plate or a color patch wherein mark indications, such as letters, symbols and drawings have been printed in a proper color on one side of the raw rubber plate, is previously partially vulcanized to a vulcanization degree of 50-80% in order to readily fit the mold and the shaping side wall following to the toroidal deformation for molding tire, so as to make the modulus at 300% to be 40-50 kg/cm$^3$ and the hardness to be 40°-50° (Shore A scale). By using such previously partially vulcanized color patch and sticking such a color patch along the circumferential direction of tire on the outer surface of the position of the side wall to be stuck with the color patch in the stage for forming the green case and only subjecting the green case to the molding and vulcanization following to the conventional process, the clear mark indications can be stably formed by only one kind of color patch without being influenced by the kind and size of tire.

The present invention will be explained in more detail.

For a better understanding of the invention, reference is taken to the accompanying drawings, wherein FIG. 1 is a front view of a color patch;

Figure 1:
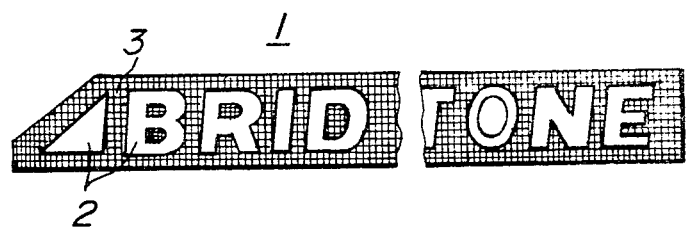
Figure 2:
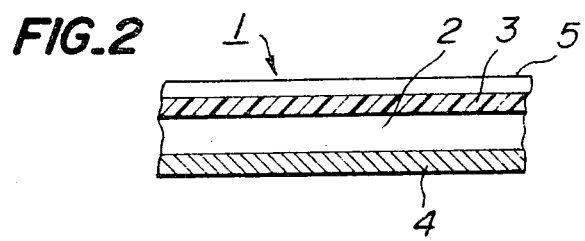
FIG. 2 is the cross-sectional view of the color patch in FIG. 1.
Figure 3:
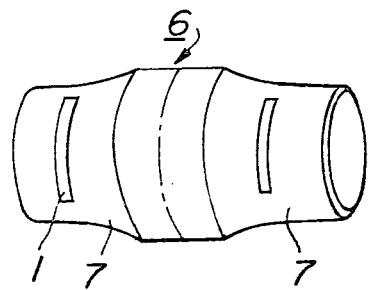
FIG. 3 is a perspective view of the green case.
Figure 4:
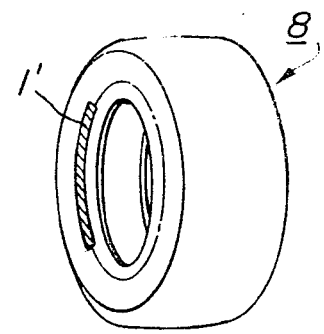
FIG. 4 is a perspective view of the tire produced by the method of the present invention.

A color patch, that is a thin rubber sheet in FIG. 1 shows an embodiment wherein a negative printing (black) 3 is applied on one side of a colored (white) rubber sheet 2 to express the letters of a company. FIG. 2 is an enlarged cross-sectional view thereof and 4 is a support sheet and 5 is a cover tape. The thickness of the thin rubber sheet 2 is preferably about 0.3 to 0.6 mm. When the color patch 1 is stuck on the position of the side wall 7 of the green case 6 shown in FIG. 3 where the color patch is to be stuck, the support sheet 4 is stripped off and the rubber sheet 2 is adhered to the side wall of the green case and is subjected to stitchering from the upper side of the cover tape 5. The cover tape 5 may be stripped off when being set in the mold or may be molded with color patch and vulcanized as such. FIG. 4 shows the perspective view of the tire 8 obtained in this invention and 1' is the mark indication.

As mentioned above, the vulcanization degree of the color patch, that is the thin rubber sheet is 50-80%. When the vulcanization degree is less than 50%, during vulcanizing the tire the rubber sheet softens and readily flows and the mark indication may distort. Furthermore, if the vulcanization degree exceeds 80%, when the tire is deformed into the toroidal shape, the stuck rubber sheet does not satisfactorily concentrically deform and further the color patch does not satisfactorily adhere to the outer layer rubber of the tire side wall.

The thin rubber sheet to be used in the present invention may be one having ends, be used by cutting a long strip or may be an endless sheet, which wind around the green case.

This rubber sheet is partially vulcanized and a mark indication is applied thereon by a printing treatment and then cover tapes are laminated on both the surfaces of the rubber sheet in such a manner that these cover tapes can be stripped off from the rubber sheet and the printed rubber sheet is protected until it is used.

When a circular color line (inclusive white) is intended to be formed on the tire side wall according to the present invention, if a colored rubber is used for the rubber sheet (base rubber) itself, the printing treatment is not necessary.

When the green case is a bias tire, after the tread rubber is applied on the cylindrical former, the rubber sheet is usually stuck on the green case, but in a radial tire, after the carcass portion is deformed into the toroidal form, the belt and the tread rubber are provided, so that in this case, after the outer layer rubber of the side wall is provided on the cylindrical former, the rubber sheet is stuck thereon.

Thus, in the present invention, the mark indication of the side wall can be simply and finely formed without needing particular troubles.

What is claimed is:

1. A method for forming a mark indication on a tire side wall, which comprises sticking a thin rubber sheet which is provided with mark indications, such as letters, symbols and drawings on one side and have been partially vulcanized to a vulcanization degree of 50-80%, along the circumferential direction of the green case at the outer surface corresponding to the side wall of the green case cylindrically formed on a cylindrical former and tightly adhering the rubber sheet integrally to the side wall, through molding the green case into a toroidal form and vulcanizing the toroidally formed green case.

2. A method as claimed in claim 1, wherein the partially vulcanized rubber sheet has a modulus at 300% of 40-50 kg/cm$^3$ and a Shore A hardness of 40°-50°.

3. A method as claimed in claim 1, wherein said thin rubber sheet has a thickness of 0.3-0.6 mm.

4. A method as claimed in claim 1, wherein the rubber sheet is printed with a mark indication on one side of said sheet.

* * * * *